(12) United States Patent
Agarwal et al.

(10) Patent No.: US 8,495,726 B2
(45) Date of Patent: Jul. 23, 2013

(54) TRUST BASED APPLICATION FILTERING

(75) Inventors: Amit Agarwal, Milpitas, CA (US); Steve Baker, Arvada, CO (US)

(73) Assignee: Avaya Inc., Basking Ridge, NJ (US)

( * ) Notice: Subject to any disclaimer, the term of this patent is extended or adjusted under 35 U.S.C. 154(b) by 728 days.

(21) Appl. No.: 12/566,354

(22) Filed: Sep. 24, 2009

(65) Prior Publication Data

US 2011/0072508 A1    Mar. 24, 2011

(51) Int. Cl.
*G06F 17/00* (2006.01)

(52) U.S. Cl.
USPC .................................. 726/13; 726/1

(58) Field of Classification Search
USPC .............. 726/1–3, 11–15; 713/150–155, 158, 713/160, 163, 165–170
See application file for complete search history.

(56) References Cited

U.S. PATENT DOCUMENTS

| | | | |
|---|---|---|---|
| 6,178,505 B1 * | 1/2001 | Schneider et al. | 713/168 |
| 6,892,307 B1 * | 5/2005 | Wood et al. | 726/8 |
| 7,093,287 B1 | 8/2006 | Gusler et al. | |
| 7,506,368 B1 * | 3/2009 | Kersey et al. | 726/12 |
| 2002/0010783 A1 * | 1/2002 | Primak et al. | 709/228 |
| 2008/0126799 A1 | 5/2008 | Winig | |
| 2009/0164774 A1 * | 6/2009 | Sherkin | 713/155 |

FOREIGN PATENT DOCUMENTS

WO    WO 2007/072245 A2    6/2007

* cited by examiner

*Primary Examiner* — Hosuk Song
(74) *Attorney, Agent, or Firm* — Sheridan Ross P.C.

(57) ABSTRACT

Methods, devices, and systems are provided for filtering packets and other communication messages or portions thereof. Particularly, mechanisms are provided for efficiently determining and applying a set of trust-based filtering rules. Trust scores may be assigned to various connections and packets received on a particular connection may have filtering rules applied thereto in accordance with the trust score of the connection.

22 Claims, 3 Drawing Sheets

TRUST BASED APPLICATION FILTERING

FIELD OF THE INVENTION

The invention relates generally to communications and more specifically to packet filtering.

BACKGROUND

Voice over Internet Protocol (VoIP) is a general term for a family of transmission technologies used to deliver voice communications over IP networks such as the Internet or other packet-switched networks. Other terms frequently encountered and synonymous with VoIP are IP telephony, Internet telephony, voice over broadband (VoBB), broadband telephony, and broadband phone.

Internet telephony refers to communications services—voice, facsimile, and/or voice-messaging applications—that are transported via the Internet, rather than the public switched telephone network (PSTN). The basic steps involved in originating an Internet telephone call include conversion of the analog voice signal to digital format and translation of the signal into Internet protocol (IP) packets for transmission over the Internet; the process is reversed at the receiving end.

VoIP systems employ session control protocols, such as the Session Initiation Protocol (SIP), to control the set-up and tear-down of calls as well as audio codes which encode speech allowing transmission over an IP network as digital audio via an audio stream. The advantage to VoIP is that a single network can be utilized to transmit data packets as well as voice and video packets between users, thereby greatly simplifying communications.

SIP is an open signaling protocol for establishing many kinds of real-time and near-real-time communication sessions, which may also be referred to as dialogs. Examples of the types of communication sessions that may be established using SIP include voice, video, and/or instant messaging. These communication sessions may be carried out on any type of communication device such as a personal computer, laptop computer, telephone, cellular phone, Personal Digital Assistant, etc. One key feature of SIP is its ability to use an end-user's Address of Record (AOR) as a single unifying public address for all communications. Thus, in a world of SIP-enhanced communications, a user's AOR becomes their single address that links the user to all of the communication devices associated with the user. Using this AOR, a caller can reach any one of the user's communication devices, also referred to as User Agents (UAs) without having to know each of the unique device addresses or phone numbers.

Since untrusted networks may be used to carry packets of information (i.e., either voice or data information), packet filtering is often employed in enterprise networks to ensure that malicious packets do not enter the enterprise network from an untrusted network thereby compromising network devices and the network itself. Packet filtering is also referred to as application filtering since a particular application is usually employed to filter packets as they enter an enterprise network. Most methods of application filtering are completely dependent on packet contents to apply filtering rules. Application filtering based on packet content along poses several limitations such as:

(1) Performance Overhead: Application filtering heavily uses regular expression searches for deep packet inspection in the application payloads, which is very processor intensive. Also, by applying application filtering blindly to all packets received at the enterprise network can cause significant performance overhead.

(2) Security Holes: Packet contents can be forged which makes it possible for an attacker to exploit application filtering. As one example, packet contents can be forged to get white list treatment from application filtering when that packet should not have received such treatment.

(3) Inflexible: Filtering rules have limited flexibility as packet contents usually have limited information. For example, packet contents do not provide any information whether a connection coming from an IP address is a multiplexed connection or a simplex connection and it is not possible to effectively apply strong rate limit policies for simplex connections.

There have been some suggestions to modify traditional application filtering mechanisms to further consider trust scores or trust levels in addition to considering packet contents. The currently proposed modifications create filtering rules once the trust score is determined. Previous art suggests adding dynamic filtering rules based on an activity/trust level derived from packets/connections. Currently available approaches of implementing trust-based filtering rules are very inefficient. For instance, if a VoIP server supports connections to 10,000 telephones, currently available filtering mechanisms will end up creating 10,000 different filtering rules or more if more than one filtering rule is applied to each telephone. The generation of these filtering rules will significantly hurt the filtering performance and will make trust-based application filtering rules unusable. Therefore, most enterprise networks will not be able to employ currently available trust-based filtering solutions.

SUMMARY

It is, therefore, one aspect of the present invention to provide a trust-based filtering mechanism that can be easily implemented in enterprise networks including large networks where a large number of packets are filtered from a large number of different devices.

In accordance with at least some embodiments of the present invention, a module for determining a connection's trust level is proposed and this module may or may not be separate from a filtering module used to implement trust-based filtering rules. In accordance with at least some embodiments of the present invention, trust for a particular connection can be determined based on credentials supplied during connection or credentials applied for Login. As one example, if a Certificate is received over a TLS connection, this may be an indication that the connection can be assigned a high trust level. As another example, a trust policy may indicate that a TCP connection from a particular subnet may not be completely trusted, but may have some level of trust greater than zero trust. As yet another example, a connection utilizing a certification which is identified in a certificate revocation list may not receive any trust.

In accordance with at least some embodiments of the present invention, a server is provided that is operable to execute trust-based packet filtering. The system may generally comprise a connection module (or socket layer) that is responsible for initially handling all connections to the server. This module may also be responsible for decrypting packets, if necessary. The system may further comprise a filtering module which applies the trust-based filtering rules in accordance with embodiments of the present invention. The system may also comprise an application module which is responsible for storing trust policies and for determining trust levels for each connection/packet.

In accordance with at least some embodiments of the present invention, once a trust level is determined for a connection, all packets belonging to that connection may have the same trust-based filtering policy applied thereto since those packets share the same trust level as the connection itself In other embodiments, each packet may be assigned a different trust level irrespective of the trust level applied to the connection to which the packet belongs. In other embodiments, it may be possible to dynamically change the trust level associated with a connection in which case packets filtered before the change is made may have a first trust-based filter policy applied thereto whereas packets filtered after the change is made may have a second, different, trust-based filter policy applied thereto. Accordingly, packets belonging to a common connection may have different trust scores associated therewith and may have different filtering polices applied thereto as a result of the changing trust score of the connection.

In accordance with at least some embodiments of the present invention, a method is provided that generally comprises:

determining a trust level or trust score for a connection;

caching, at a socket layer module, the trust level for the connection;

receiving, at the socket layer module, a packet, the packet being transmitted over the connection; and tagging, by the socket layer module, the packet with the cached trust level for the connection.

The method may further include transmitting the tagged packet from the connection module to a filtering module that has access to a table mapping filtering rules to trust levels. The filtering module may then determine the appropriate filtering rule to apply to the packet, based on the trust level tagged to that packet. The filtering module then applies the filtering rule and passes some or all of the packet, if the filtering rule permits, to an application module for processing.

Advantages offered by the present invention include the fact that centralized trust policies can be written in a single place and can be applied by a trust module indirectly by using application filtering. For instance, the trust policy for a whitelist connection can be maintained at a trust module. There is no need for configuring separate whitelists at the point where filtering is performed. Accordingly, trust policies can be shared throughout an enterprise network. Trust-based filtering rule sets also provide far greater flexibility as compared to prior art filtering rule sets. Furthermore, use of trust-based filtering rule sets allows filtering to be performed without being completely dependent on packet content, thereby increasing security of the overall system.

The term "computer-readable medium" as used herein refers to any tangible storage and/or transmission medium that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

The terms "determine," "calculate" and "compute," and variations thereof, as used herein, are used interchangeably and include any type of methodology, process, mathematical operation or technique.

The term "module", "agent", or "tool" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The preceding is a simplified summary of embodiments of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

DETAILED DESCRIPTION

The invention will be illustrated below in conjunction with an exemplary communication system. Although well suited for use with, e.g., a system using a server(s) and/or data base(s), the invention is not limited to use with any particular type of communication system or configuration of system elements. Those skilled in the art will recognize that the disclosed techniques may be used in any communication application in which it is desirable to filter packets according to trust-based rules.

The exemplary systems and methods of this invention will also be described in relation to analysis software, modules, and associated analysis hardware. However, to avoid unnecessarily obscuring the present invention, the following description omits well-known structures, components and devices that may be shown in block diagram form, are well known, or are otherwise summarized.

For purposes of explanation, numerous details are set forth in order to provide a thorough understanding of the present invention. It should be appreciated, however, that the present invention may be practiced in a variety of ways beyond the specific details set forth herein.

Figure 1:
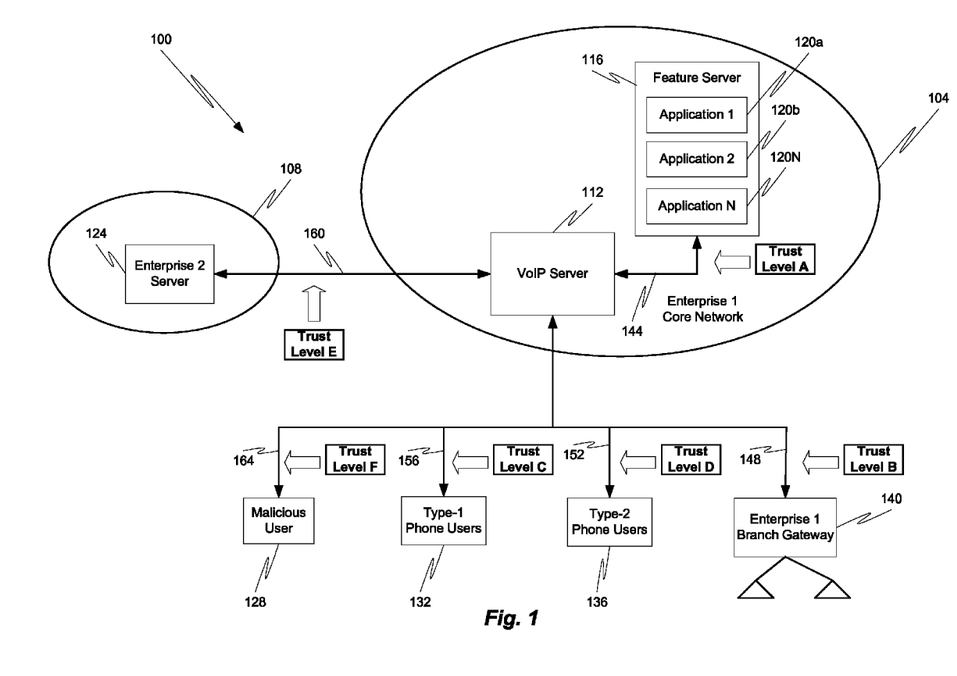
FIG. 1 is a block diagram depicting a communication system in accordance with at least some embodiments of the present invention.

With reference initially to FIG. 1, an exemplary communication system 100 will be described in accordance with at least some embodiments of the present invention. More specifically, the communication system 100 may comprise a plurality of communication device in communication with one another using a number of possibly different communication modalities. More specifically, the communication system 100 may comprise a first enterprise network 104, which may also be referred to as a core network. The first enterprise network 104 may be owned and operated (e.g., administered) by a single entity or enterprise. Communications within the first enterprise network 104 are generally trusted communications since all devices within the first enterprise network 104 are usually administered by a single authority. The first enterprise network 104 may also be connected with a second enterprise network 108. In some embodiments, the communications between enterprise networks may not necessarily carry the same amount of trust as intra-enterprise communications, particularly because the second enterprise network 108 may be provisioned by a different authority than the first enterprise network 104.

In accordance with at least some embodiments of the present invention, the first enterprise network 104 may comprise an enterprise server 112, such as a VoIP server 112. The VoIP server 112 is typically responsible for managing all VoIP signals and communications for the user devices within the first enterprise network 104. The first enterprise network 104 may also comprise a feature server 116 that is responsible for providing one or more features to the communication devices within the first enterprise network 104. The types of features offered by the feature server 116 may vary depending upon the application or applications 120a-N residing on the feature server 116. In accordance with at least some embodiments of the present invention, the feature server 116 may comprise a conferencing application that enables the feature server 116 to provide conferencing features to the various users within and outside of the first enterprise network 104. The VoIP server 112 may be adapted to communicate with the feature server 116 to facilitate voice conferencing applications among various users within and external to the first enterprise network 104.

Moreover, the first enterprise network 104 may comprise one or more branch gateways 140 that connect the VoIP server 112 with external communication devices. The gateway 140 may be adapted to translate communication protocols and/or addresses between communication networks. Additionally, the gateway 140 may also be adapted to route messages to/from the external communication devices to the enterprise server 112 or feature server 116 for processing by one or more applications 120a-N in the feature server 116.

Similar to the first enterprise network 104, the second enterprise network 108 may also comprise its own enterprise server 124. The second enterprise server 124 may comprise any type of server for supporting communications of the second enterprise 108. In some embodiments, the second enterprise server 124 may also correspond to a VoIP server that is capable of communicating with the VoIP server 112 in the first enterprise network 104. The second enterprise server 124 may connect to the VoIP server 112 to get communication services within the first enterprise network 104.

The various networks 104, 108 and devices therein may be adapted to communication using any type of known communication medium or collection of communication mediums and may use any type of protocols to transport messages between endpoints. The networks 104, 108 may also include wired and/or wireless communication technologies.

In addition to comprising enterprise networks 104, 108, the communication system 100 may also comprise a number of different user communication devices. Examples of such user communication devices include, but are not limited to, a communication endpoint being used by a malicious or untrusted user 128, endpoints being used by type-1 users 132, and endpoints being used by type-2 users 136. The user devices or endpoints may be any type of known communication or processing device such as a personal computer, laptop, Personal Digital Assistant (PDA), cellular phone, smart phone, telephone, analog phone, DCP phone, or combinations thereof. In general, the user devices may be adapted to support video, audio, text, and/or data communications with other communication devices. The type of medium used by the user devices to communicate with other communication devices may depend upon the communication applications available on the communication device and/or the applications provided on the feature server 116 or first enterprise server 112.

In accordance with at least some embodiments of the present invention, each connection established at the VoIP server 112 may be assigned a trust level or trust score. The trust level may be assigned and determined either dynamically during establishment of the connection or by pre-provisioning of trust rules by an administrator of the first enterprise network 104. In the exemplary embodiment depicted in FIG. 1, a highly trusted connection is a connection between two devices in the same enterprise network. More specifically, the connection 144 between the first enterprise server 112 and the feature server 116 (or any other device within the first enterprise network 104) represents an intra-enterprise connection. This connection 144 can be assigned a first high trust level, meaning that there is no need to apply filtering rules to any packet received over this connection. As previously discussed, the internal communications can be completely trusted since all devices within the first enterprise network 104 are generally administered by a common entity or person according to common policies.

A less trusted connection may be established between the first enterprise server 112 and the branch gateway 140. Specifically, the connection 148 represents a connection from the first enterprise network's gateway 140 to the first enterprise server 112. In this example, the branch gateway 140 has a high level of trust with the first enterprise server 112 and contents transmitted from the branch gateway 140 to the first enterprise server 112 may be trusted. The amount of trust afforded this connection 148 may be a complete trust which is the same amount of trust afforded the intra-enterprise connection 144 established between servers or possibly a slightly lesser amount of trust than connection 144, in which case a slightly different trust score may be assigned to connection 148.

Connections 152, 156 between endpoints being used by endpoints 132, 136 and the first enterprise server 112 may be assigned a different level of trust. Specifically, the connection 156 between endpoints being used by type-1 users 132 and the first enterprise server 112 may be assigned a third trust level and the connection 152 between endpoints being used by type-2 users 136 and the first enterprise server 112 may be assigned a fourth trust level.

The third trust level for type-1 users is relatively high (possibly the same or slightly less than the trust level assigned to connections 144 and 148) since type-1 users have a strong trust relationship with the first enterprise network 104. Particularly, type-1 users may comprise local users with an enterprise provided Virtual Local Area Network (VLAN) protection. Packets and contents contained therein which are transmitted over this connection 156 may be trusted due to the fact that the connection is administered by the enterprise (e.g., rules of the VLAN are administered by the first enterprise network 104).

The fourth trust level assigned to connection 152 may be somewhat lower than connection 156 because type-2 users do not have the same strong trust relationship with the first enterprise 104 that type-1 users have with the first enterprise 104. Specifically, this connection 156 may be relatively untrusted since type-2 users are not connecting over a controlled link. Packets and contents thereof transmitted over connection 152 may need to have more strict filtering rules applied thereto based on their lower trust level.

A connection 160 between enterprise networks (e.g., between servers of different enterprise networks) may have a different trust level assigned thereto. Since the connection 160 is not completely controlled by a single enterprise a less than complete trust score may be assigned to connection 160 and it may be necessary to scrutinize packets transmitted over connection 160. The trust level assigned to connection 160 may be the same or different as the trust level assigned to connection 152 and will likely be different than the trust level assigned to connections 144, 148 and 156.

Finally, a connection 164 between an endpoint being operated by a malicious user 128 and the first enterprise server 112 may be assigned a very low level of trust and may even be assigned a negative level of trust (i.e., DO NOT trust the connection). These malicious users may be identified by the first enterprise server 112 based on credentials provided from the endpoint to the first enterprise server 112 (e.g., these users may be using revoked certificates for a TLS connection, may be using a user authentication from a user listed on a blacklist, etc.).

Figure 2:
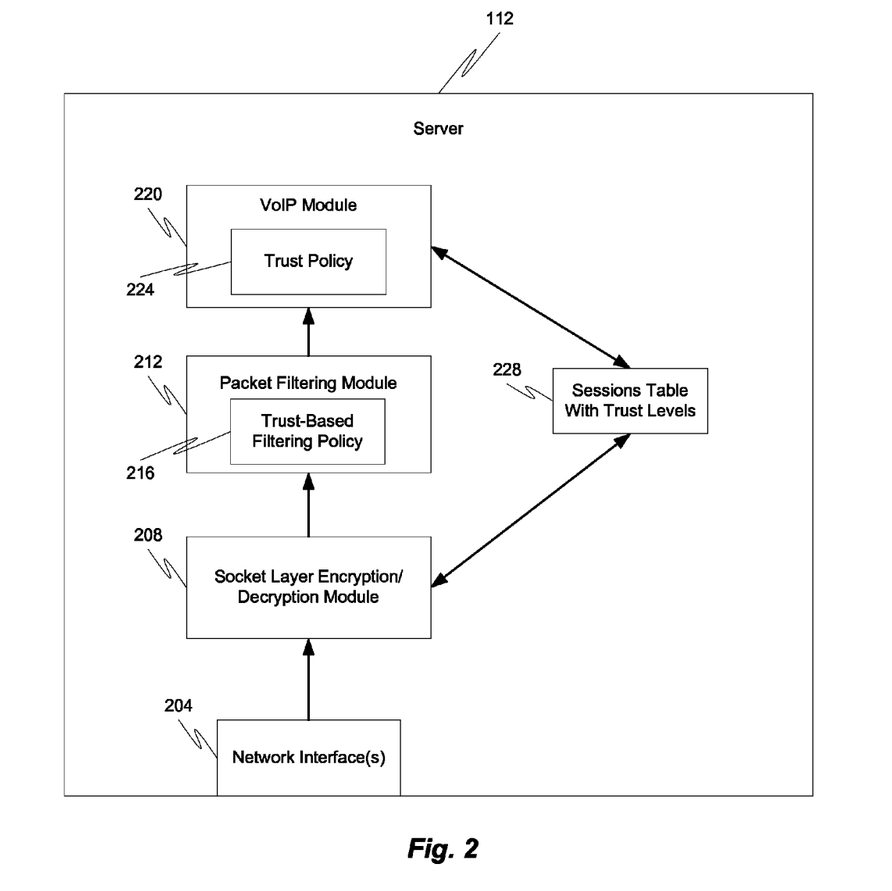
FIG. 2 is a block diagram depicting an exemplary server in accordance with at least some embodiments of the present invention.

Referring now to FIG. 2, a more detailed diagram of the first enterprise server 112 will be described in accordance with at least some embodiments of the present invention. The first enterprise server 112 may comprise one or more modules for filtering packets received at the server. In some embodiments the server 112 includes a network interface or network adaptor 204 that is capable of providing a physical connection or plurality of physical connections between the server 112 and the rest of the communication system 100. Exemplary network interfaces 204 include, without limitation, a network port (e.g., Ethernet port, USB port, serial port, etc.), a network interface card, a modem, a wireless communication adaptor having a wireless antenna, and combinations thereof.

The server 112 may also comprise a sessions table 228, a socket layer encryption/decryption module 208, a packet filtering module 212, and a voice module 220. The sessions table 228 may comprise a number of fields for maintaining information related to the various connections at the server 112 and trust levels associated with said connections. Additional fields contained in the sessions table 228 may include, without limitation, time of connection establishment, connection duration, connection identification details (e.g., connection type, connection port, sender identification, and other information which may be found in packets transmitted across the connection), and so on.

The socket layer module 208 is adapted to populate the sessions table 228 with network and/or transport layer credentials for each connection established at the server 112. The socket layer module 208 may also populate any other fields in the sessions table 228 which describe the connection. The information placed in the sessions table 228 by the socket layer module 208 may be used by the voice module 220 to identify the connection type and determine a trust level associated therewith. As one example, the socket layer module 208 may determine and populate a far end IP address (of the device connecting to the server 112) and local port used at the server 112 for a TCP connection. As another example, the socket layer module 208 may determine and populate a far end identity certificate being used by the device connecting to the server 112 for a TLS connection.

Once network/transport layer information for a new connection is populated in the sessions table 228, the voice module 220 is adapted to invoke its trust policies 224 to determine a trust level for the connection. More specifically, the voice module 220 uses its trust policies 224 to assign trust levels to each connection based on one or more of IP address information, VPN connection information, authentication certificate information (e.g., for an IPSec connection), and any other type of connection information in the sessions table 228. The trust policies 224 which are used to map a particular connection type to a trust level or trust score may be pre-provisioned by a system administrator (i.e., an administrator of the first enterprise network 104). As one example, if it is determined that a far end IP address is a local VLAN address, then complete trust may be assigned to the connection supporting that far end IP address. As another example, if it is determined that the far end identity certificate is verified by a first enterprise Certificate Authority (CA) certificate and it is further determined that the Certificate Number (CN) of the far end identity certificate contains a string "trusted user", then complete trust may also be assigned to the connection supporting that far end IP address. Additional details related to determining trust levels for a particular connection are described in further detail in U.S. patent application Ser. No. 12/196,584, the entire contents of which are hereby incorporate herein by reference.

It should be noted that the trust policies 224 and trust scores of any particular connection may be changed at any time. Specifically, it may be possible to have the trust policies 224 changed during a session in which case a single connection may have its trust level changed from a first level to a second level. Additionally, trust levels may be changed for a session based on activity of that session (e.g., if particular actions are detected at the far end device indicating that a greater or lesser amount of trust should be assigned to that connection).

Once the trust level of a connection has been determined by the voice module 220, the sessions table 228 is further populated with the trust level information for the connection. At this point the sessions table 228 comprises information mapping a particular connection to a particular trust level.

This trust information can then be used by the socket layer module 208 to tag packets received over a connection with a trust tag indicating the trust level assigned to that packet vis-à-vis the connection. Tagged packets can then be transferred to the packet filtering module 212 which applies trust-based filtering policies 216 to the packet. More specifically, the filtering module 212 is adapted to filter packets according to the trust level tagged to that packet by the socket layer module 208. As can be appreciated by one skilled in the art, the trust-based filtering policies may vary depending upon the trust level assigned to a packet. Packets having relatively higher levels of trust may not require any filtering (e.g., the packets may be applied to pass through the packet filtering module 212 without having any filter applied thereto) or may only require a minimal strength filter rule. Packets having a relatively lower level of trust may have stricter filtering rules applied thereto.

The packets, once filtered by the packet filtering module 212, are transferred to the voice module 220 where they can be processed in accordance with the services of the voice module 220. The filtered packets may also be provided to other devices in the enterprise network 104 without having additional filtering rules applied thereto.

Figure 3:
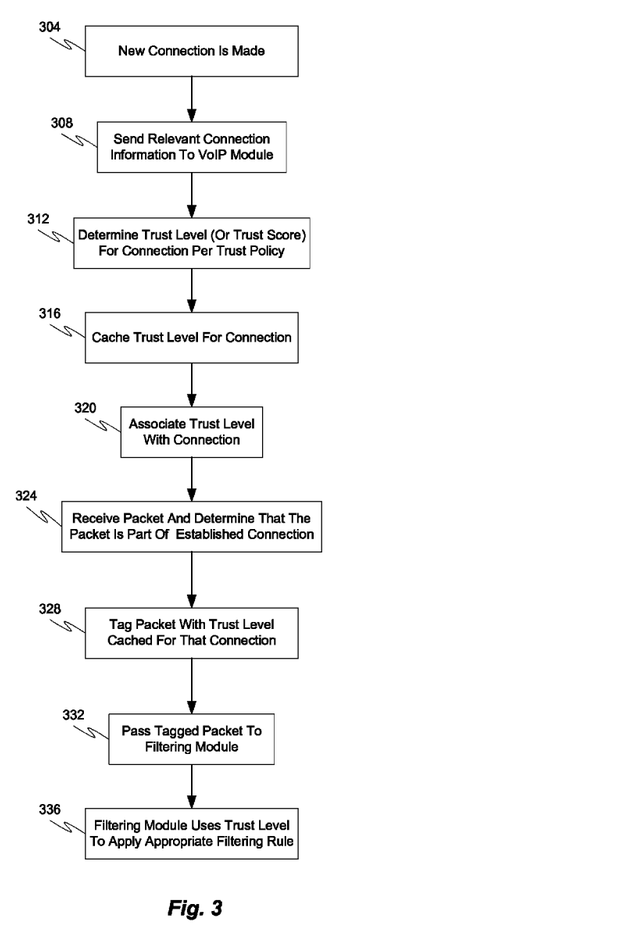
FIG. 3 is a flow diagram depicting a method of processing one or more packets in accordance with at least some embodiments of the present invention.

With reference now to FIG. 3, an exemplary method of processing packets received at an enterprise network 104 will be described in accordance with at least some embodiments of the present invention. The method is initiated when a new connection is established between the server 112 and another communication device (step 304). Thereafter, the socket layer module 208 sends relevant connection information to the voice module 220 via the sessions table 228 (step 308). This enables the voice module 220 to determine a trust level or trust score for the connection per the trust policies 224 (step 312).

After a trust level has been assigned to the connection, the method continues with the socket layer module 208 retrieving the relevant trust level information from the sessions table 228. The socket layer module 208 is then adapted to cache the trust level information in association with the connection for future reference (steps 316 and 320). This allows the socket layer module 208 to quickly analyze packets and (1) determine which connection the packet belongs to, (2) determine a trust level associated with the connection and the associated packet, and (3) tag the packet with the determined trust level.

Accordingly, the method continues when a packet is received at the network interface 204 and forwarded to the socket layer module 208 where the connection associated with the packet is identified (step 324). Thereafter, the socket layer module 208 tags the packet with the appropriate trust level (i.e., the trust level assigned to the associated connection), possibly by altering a header of the packet with an identifier which indicates the trust level (step 328).

The tagged packet is then passed to the packet filtering module 212 (step 332) wherein the trust level is analyzed from the tag. The packet filtering module 212 utilizes the determined trust level to identify the appropriate trust-based filtering policy 216 and apply said policy to the packet (step 336). Once the appropriate filtering policy 216 has been applied to the packet, the packet is forwarded to its destination within the enterprise network 104 (e.g., the voice module 220).

As one example, there may be multiple trust-based filtering policies 216 that can be applied for different trust levels. A connection having high level of trust (e.g., trust level A) may be allowed to have its packets pass completely unfiltered. A connection having a slightly lower level of trust (e.g., trust level B) may also be allowed to have its packets pass completely unfiltered unless the session threshold exceeds 5000 packets/second, in which case a rate limit filtering policy may be applied to packets received over that connection. A connection having a still lower level of trust (e.g., trust levels C or D) may also be allowed to have its packets pass through the filtering module 212 unless the session threshold exceeds 5 packets/second, in which case a rate limit filtering policy may be applied to packets received over that connection. A connection having a still lower level of trust (e.g., trust level D or E) may have its packets dropped if a content inspection validation step fails. This may require expensive content validation for a session where needed. If a connection has the lowest level of trust (e.g., trust level F), all packets received on that connection may be blocked.

While the above-described flowchart has been discussed in relation to a particular sequence of events, it should be appreciated that changes to this sequence can occur without materially effecting the operation of the invention. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The systems, methods and protocols of this invention can be implemented on a special purpose computer in addition to or in place of the described communication equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a server, personal computer, any comparable means, or the like. In general, any device capable of implementing a state machine that is in turn capable of implementing the methodology illustrated herein can be used to implement the various communication methods, protocols and techniques according to this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The analysis systems, methods and protocols illustrated herein can be readily implemented in hardware and/or software using any known or later developed systems or structures, devices and/or software by those of ordinary skill in the applicable art from the functional description provided herein and with a general basic knowledge of the communication and computer arts.

Moreover, the disclosed methods may be readily implemented in software that can be stored on a storage medium, executed on a programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications device or system.

It is therefore apparent that there has been provided, in accordance with embodiments of the present invention, systems, apparatuses and methods for filtering voice, video, and/or data packets. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

What is claimed is:

1. A method, comprising:
   determining a trust level for a connection established between a communication device and an enterprise server;
   caching, at a socket layer module, the trust level for the connection;
   receiving, at the socket layer module, a packet, the packet being received over the connection; and
   tagging, by the socket layer module, the packet with the cached trust level for the connection.

2. The method of claim 1, wherein the trust level for the connection is maintained at a centralized sessions table.

3. The method of claim 1, wherein the connection comprises a trusted connection and wherein a header of the packet is tagged with information indicating that no filtering is necessary for the packet.

4. The method of claim 3, wherein the connection comprises one or more of an intra-enterprise connection, an IPSec connection, a VPN connection, and a TLS connection.

5. The method of claim 1, wherein the connection comprises a semi-trusted connection and wherein a packet transmission rate over the connection is monitored to determine if rate limit filtering is to be applied to the packets received over the connection.

6. The method of claim 5, further comprising:
   determining that the packet transmission rate is above a predetermined threshold; and
   tagging the packet with information indicating that rate limit filtering is to be applied to the packet.

7. The method of claim 1, wherein the connection comprises an untrusted connection and wherein the tag indicates that the packet is to be dropped.

8. The method of claim 7, wherein the connection comprises a connection over which a user has provided an invalid or expired authentication certificate.

9. A method, comprising:
   determining a trust level for a connection established between a communication device and an enterprise server;
   caching, at a socket layer module, the trust level for the connection;
   receiving, at the socket layer module, a packet, the packet being received over the connection;
   tagging, by the socket layer module, the packet with the cached trust level for the connection;
   passing the tagged packet to a packet filtering module;
   receiving the tagged packet at the packet filtering module;
   analyzing, by the packet filtering module, the tag of the received packet;
   identifying, based on the tag of the packet, a trust-based filtering policy to be applied to the packet; and
   applying the identified trust-based filtering policy to the packet.

10. The method of claim 9, further comprising:
    forwarding the filtered packet to a device an enterprise device for further processing.

11. The method of claim 1, further comprising:
    changing the trust level of the connection, wherein changing the trust level of the connection results in packets received prior to the change being assigned a first trust level and packets received after the change being assigned a second trust level different from the first trust level.

12. The method of claim 1, further comprising:
    defining filtering rules that comprise trust levels associated therewith; and
    applying the filtering rules to the packet.

13. A server, comprising:
    a sessions table comprising a mapping of connections established at the server to trust levels associated with each connection;
    a socket layer module adapted to retrieve a trust level for a connection and further adapted to tag a packet received over the connection with the trust level of the connection; and
    a filtering module adapted to apply trust-based filtering rules to the packet based on trust-level information contained in the tag of the packet.

14. The server of claim 13, wherein the sessions table is centralized and shared among a plurality of different socket layer modules.

15. The server of claim 13, wherein the connection comprises a trusted connection and wherein a header of the packet is tagged with information indicating that no filtering is necessary for the packet.

16. The server of claim 15, wherein the connection comprises one or more of an intra-enterprise connection, an IPSec connection, a VPN connection, and a TLS connection.

17. The server of claim 13, wherein the connection comprises a semi-trusted connection and wherein a packet transmission rate over the connection is monitored to determine if rate limit filtering is to be applied to the packets received over the connection.

18. The server of claim 17, wherein the socket layer module is further adapted to determine that the packet transmission rate is above a predetermined threshold and tagging the packet with information indicating that rate limit filtering is to be applied to the packet.

19. The server of claim 13, wherein the connection comprises an untrusted connection and wherein the tag indicates that the packet is to be dropped.

20. The server of claim 19, wherein the connection comprises a connection over which a user has provided an invalid or expired authentication certificate.

21. A server, comprising:
    a sessions table comprising a mapping of connections established at the server to trust levels associated with each connection;
    a socket layer module adapted to retrieve a trust level for a connection and further adapted to tag a packet received over the connection with the trust level of the connection;
    a filtering module adapted to apply trust-based filtering rules to the packet based on trust-level information contained in the tag of the packet, wherein the sessions table is adapted to be dynamically changed after the connection has been established and before the connection has been terminated, wherein a change to the sessions table results in a change to a trust level of the connection and wherein the change to the trust level of the connection results in packets received prior to the change being assigned a first trust level and packets received after the change being assigned a second trust level different from the first trust level.

22. A computer program product comprising computer executable instructions stored onto a non-transitory computer readable medium which, when executed by a processor of a computer, cause the processor to execute a method, the method comprising:

determining a trust level for a connection established at an enterprise server;

receiving a packet over the connection;

tagging the packet with the trust level for the connection; and forwarding the tagged packet to a filtering module for filtering in accordance with the trust level of the connection.

\* \* \* \* \*